United States Patent [19]
Yasunaga et al.

[11] Patent Number: 5,983,362
[45] Date of Patent: Nov. 9, 1999

[54] NON-INTERRUPTED OPERATION CONTROL APPARATUS FOR A MODULATOR-DEMODULATOR

[75] Inventors: Masaru Yasunaga; Takeshi Asahina; Shigeru Hashimoto, all of Kawasaki, Japan

[73] Assignee: Fujitsu Limited, Kanagawa, Japan

[21] Appl. No.: 08/862,712

[22] Filed: May 23, 1997

Related U.S. Application Data

[63] Continuation of application No. 08/439,778, May 12, 1995, abandoned.

[30] Foreign Application Priority Data

May 24, 1994 [JP] Japan .................................. 6-109347

[51] Int. Cl.⁶ .................................................. G06F 13/00
[52] U.S. Cl. ............................................ 714/23; 714/24
[58] Field of Search ........................... 395/182.2, 182.21, 395/182.12, 182.22, 750.01, 750.03, 750.05; 364/707; 370/311; 379/413; 714/2, 23, 24

[56] References Cited

U.S. PATENT DOCUMENTS

| | | | |
|---|---|---|---|
| 4,593,323 | 6/1986 | Kanda et al | 358/256 |
| 4,742,482 | 5/1988 | Inskeep et al. | 364/900 |
| 4,951,309 | 8/1990 | Gross et al. | 379/98 |
| 5,070,253 | 12/1991 | Wagner | 307/75 |
| 5,109,506 | 4/1992 | Begun | 395/182.21 |
| 5,272,382 | 12/1993 | Heald et al. | 307/66 |
| 5,297,276 | 3/1994 | Millar et al. | 395/182.21 |
| 5,345,583 | 9/1994 | Davis | 395/182.21 |
| 5,408,149 | 4/1995 | Aneha et al. | 327/544 |
| 5,461,302 | 10/1995 | Garcia et al. | 323/222 |

FOREIGN PATENT DOCUMENTS

| | | |
|---|---|---|
| 3-98359 | 4/1991 | Japan . |
| 3-258155 | 11/1991 | Japan . |
| 4-278617 | 10/1992 | Japan . |

*Primary Examiner*—Norman Michael Wright
*Attorney, Agent, or Firm*—Armstrong, Westerman, Hattori, McLeland & Naughton

[57] ABSTRACT

A non-interrupted operation control apparatus for a modem is provided for the purpose of preventing communications errors caused by the corruption of control parameter data stored within the modem, and circuit hangs, wherein an initialization unit is provided for the purpose of periodically initializing the modem at prescribed time intervals during a period of no communications via the modem. The initialization unit performs resetting of the hardware and setting of control parameters anew at prescribed time intervals.

2 Claims, 11 Drawing Sheets

5,983,362

NON-INTERRUPTED OPERATION CONTROL APPARATUS FOR A MODULATOR-DEMODULATOR

This application is a File Wrapper Continuation of application Ser. No. 08/439,778 filed May 12, 1995, now abandoned.

BACKGROUND OF THE INVENTION

1. Field of the Invention

The present invention relates to a non-interrupted operation control apparatus for a modulator-demodulator, and more specifically it relates to non-interrupted operation control for the purpose of operating a modulator-demodulator for a long period of time.

In data-processing equipment (hereinafter referred to as controllers) such as computer terminals which operate or are in the standby condition for a number of days continuously, and use a modulator-demodulator (hereinafter referred to as modem), externally introduced noise or radiation and the like can cause corruption of the parameter data held in the internal non-volatile memory of the modem, causing the modem to fail to operate or causing the modem circuit to hang up and thereby stop operating. For this reason, there is a need for a non-interrupted operation control apparatus for a modem which prevents the abnormal communications conditions which cause such phenomena.

2. Description of the Related Art

In a modem operation control apparatus having a control section, a modem section and a power supply, the modem section is modularized and made to be generally usable by allowing control parameters to select the communications mode and the like. Fixed parameters are first set into non-volatile memory, and hardware-specific parameters such as communications speed and test method are set into internal registers in the modem from the control section when the main power switch is used to apply power.

When the power is applied, the reset section of the modem section performs an internal reset of the modem. In the control section, an initialization section performs a hardware reset and initialization within the control section, after which the parameter setting section is started, whereby parameter setting commands are issued to the modem section. In the modem section, when a command interpreting section recognizes these commands, parameters from the above-noted controller are set into the above-noted registers.

However, modems are often left powered up or in the standby condition for many days. For this reason, externally introduced noise or radiation can cause corruption of the settings of control parameters which are set in non-volatile memory, this resulting in endless software loops or halt conditions and this hanging the circuit or resulting in abnormal communications conditions.

In the waiting-for-call condition, from the standpoint of reduction of cost and an increase in the life of the equipment, one can envision turning off the supply of power to the control section. However, in this type of equipment, this would lead to the problem of not being able to monitor modem problems such as described above.

SUMMARY OF THE INVENTION

In view of the above-described problems, an object of the present invention is to provide a non-interrupted operation control apparatus for a modem which solves the problems of communications errors caused by corruption of control parameters which establish communications mode and the like and of hangs caused by circuit runaway.

In accordance with the present invention, a non-interrupted operation control apparatus for a continuously operated modem is provided, this non-interrupted operation control apparatus having a modem and a controller, the controller having an initialization means which performs initialization processing of the modem at prescribed time intervals when the modem is in the non-communicating condition.

The above-noted initialization means issues a reset command to reset the above-noted modem at the prescribed interval, the control parameters set in the internal memory of the modem being set anew at the prescribed interval, and the modem being reset at a prescribed interval by removing and re-supplying power.

According to the present invention, a non-interrupted operation control apparatus for a continuously operated modem is provided, this controller having a modem and its associated controller, and a power supply controller, this power supply controller having a main power switch which turns the power to the above-noted modem on and off, and an auxiliary power switch which turns the power to the above-noted controller on and off in the condition in which the main power switch is in the on condition.

The above apparatus includes a power-on section which turns the auxiliary power switch on when the above-noted main power switch is in the on condition and a signal is detected from the communications circuit, and further includes a power-off section which turns the above-noted auxiliary power switch off when the main power switch is on and communications are completed. It also includes an initialization means which performs initialization of the modem immediately before the above-noted auxiliary power switch is turned on or turned off.

In addition, the above-noted apparatus has a initialization means which, when the main power switch is on and the above-noted auxiliary power switch is off, turns off and on at a prescribed time interval. The above-noted initialization means prohibits the periodic turning on and off of the above-noted main power switch when the auxiliary power switch is turned on.

BRIEF DESCRIPTION OF THE DRAWINGS

The present invention will be more clearly understood from the description as set forth below, with reference being made to the accompanying drawings.

DESCRIPTION OF THE PREFERRED EMBODIMENTS

Figure 1:
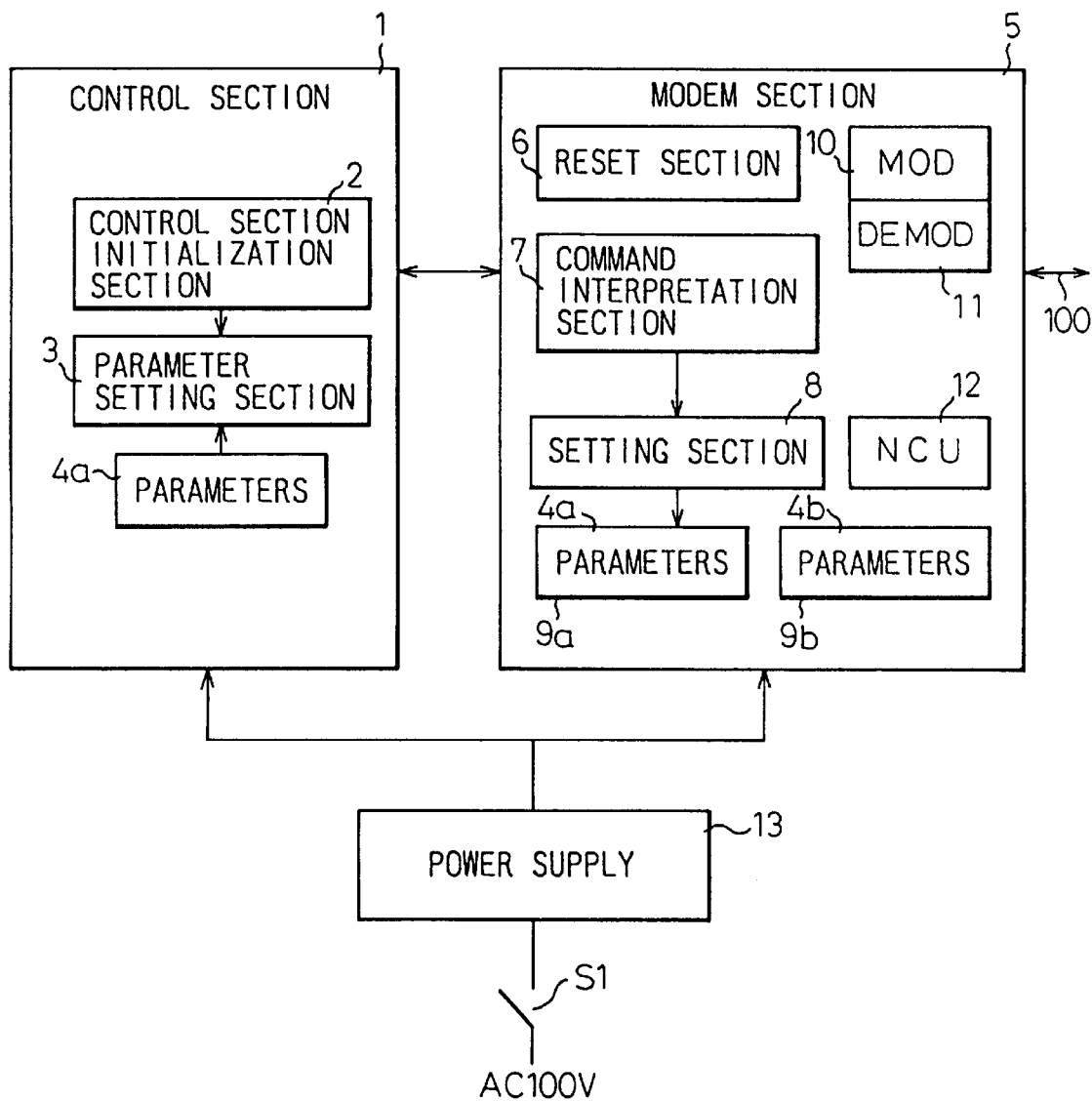
FIG. 1 is a block diagram which shows an example of a non-interrupted operation control apparatus for a modem in the prior art.

Before describing the preferred embodiments according to the present invention, examples of the related art are provided, with reference being made to FIG. 1.

FIG. 1 is a block diagram which shows an example of a non-interrupted operation control apparatus for a modem of the prior art. FIG. 1 shows the configuration of an apparatus having a control section 1, a modem 5, and a power supply 13.

In FIG. 1, the modem 5 is modularized and also made universal by enabling selection of the communications mode and the like by means of control parameters, with fixed parameters 4b being pre-stored in non-volatile memory 9b, and local hardware-specific parameters 4a, such as communications speed and test method, set from the control section 1 into register 9a of the modem 5 when the power supply 13 is switched on.

When the power supply is switched on, on the modem section side, the reset section 6 resets internal hardware within the modem. On the control section side, the control section initialization section performs a hardware reset within the control section, after which the parameter setting section 3 is started.

The thus started parameter setting section 3 issues a parameter setting command to the modem section 5, and when a command interpretation section 7 recognizes the command a setting section 8 sets parameter 4a sent from the control section 1 into the internal register 9a. In FIG. 1, a modulation section (MOD) 10 and a demodulation section (DEMOD) 11 perform modulation and demodulation of the transmitted signals, and a network control unit (NCU) 12 performs network control related to calling and receiving such as automatic call receiving by means of ring and carrier detection.

Modems are often left powered up or in the standby condition for many days. For this reason, externally introduced noise or radiation can cause corruption of the settings of control parameters which are set in non-volatile memory and circuit hangup, leading to the problems of communications errors and stoppage of operation. In particular in the waiting-for-call condition, from the standpoint of reduction of cost and lifetime, one can envision turning off the supply of power to the control section. However, in this type of equipment, this would lead to the problem of not being able to monitor modem problems such as described above.

Figure 2:
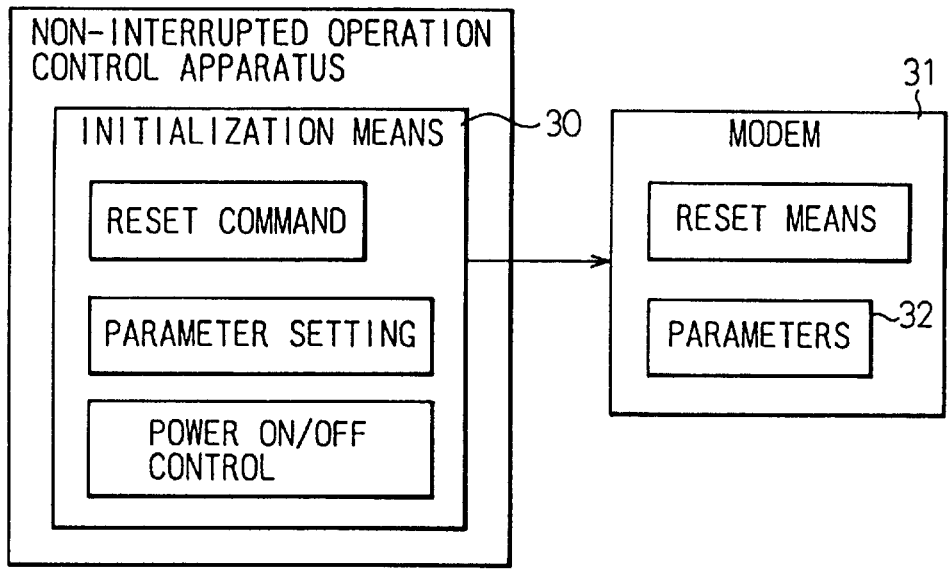
FIG. 2 is a drawing (1) which illustrates the principle of the non-interrupted operation control apparatus for a modem according to the present invention.
Figure 3:
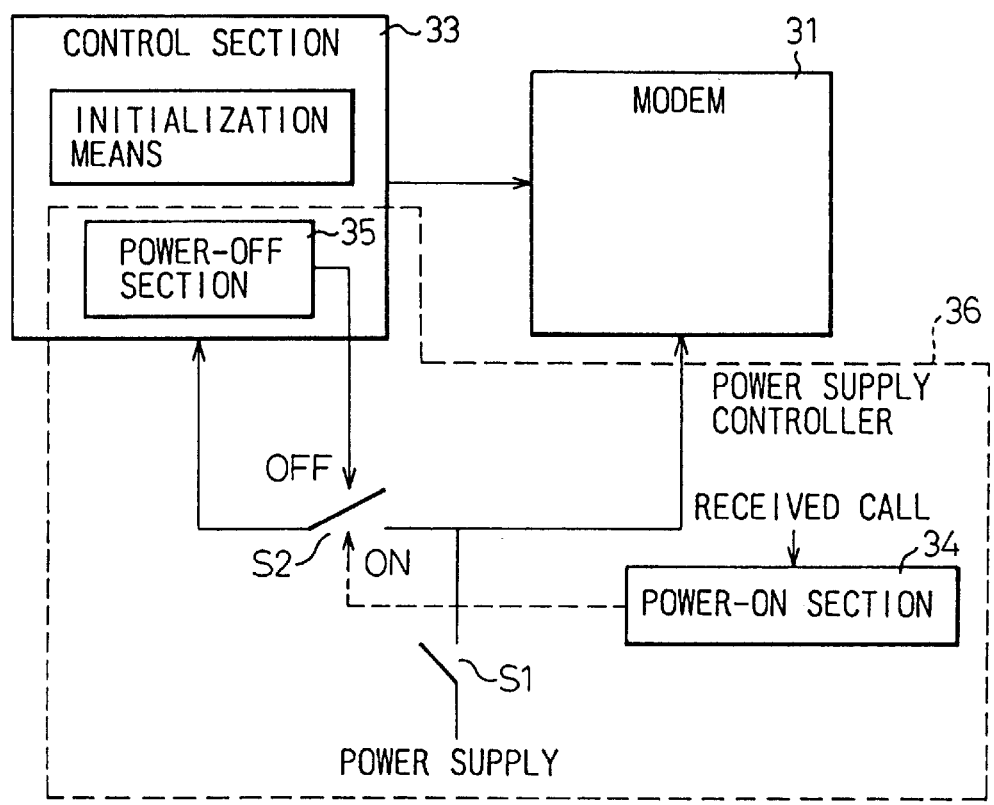
FIG. 3 is a drawing (2) which illustrates the principle of the non-interrupted operation control apparatus for a modem according to the present invention.

FIG. 2 and FIG. 3 shows the principle of a non-interrupted operation control apparatus for a modem according to the present invention.

The non-interrupted operation control apparatus for a modem shown in FIG. 2 has the following constitutional features.

(1) It has an initialization means 30 which, when the continuously operating modem 31 is in the non-communicating condition, performs initialization of the modem 31 at prescribed time intervals.

(2) It is configured so that the initialization means 30, indicated in (1) above, outputs a reset command at prescribed time intervals to reset the modem 31.

(3) It is configured so that the initialization means 30, indicated in (1) above, sets anew the control parameters set in the memory 32 within the modem at prescribed time intervals.

(4) It is configured so that the initialization means 30, indicated in (1) above, turns the power to the modem off and then on again at prescribed time intervals so as to reset the modem.

Next, the controller 36 of a non-interrupted operation control apparatus for a modem according to the present invention has the following constitutional features.

(5) It has a main power switch S1 which supplies power to the apparatus which includes the above-noted control section 33 and the modem 31 and which turns on and off the power to the modem 31, and an auxiliary power switch S2 which, when switch S1 is in the on condition, turns on and off the power to the control section 33.

(6) In the above-noted (5), there is provided a power-on section 34 which turns the auxiliary power switch S2 on when a call from the circuit is detected with the main power switch S1 in the on condition.

(7) In the above-noted (6), there is provided a power-off section 35 which turns the auxiliary power switch S2 off when in the wait-for-call condition.

(8) In a non-interrupted operation control apparatus for a modem having the constitutional features noted in (5), (6), and (7) above, there is provided an initialization means which initializes the modem 31 when the auxiliary power switch S2 is turned on.

(9) In a non-interrupted operation control apparatus for a modem having the constitutional features noted in (5), (6), and (7) above, there is provided an initialization means which periodically turns off and then on the auxiliary power switch S2 when the main power switch S1 is in the on condition and the auxiliary power switch is in the off condition.

(10) In the above-noted (9), there is provided an initialization means which prohibits the periodic turning on and off of the main power switch S1 when the auxiliary power switch S2 is in the on condition.

(11) In a non-interrupted operation control apparatus for a modem configured as above in (7), the configuration is such that the initialization of the modem 31 is performed at the point at which the power is turned off.

From the above:

(i) The continuously operated modem 31 of the present invention is initialized (either by being reset or by having the control parameters set anew, or both) periodically when it goes into the non-communicating condition. The methods of initialization include the following.

① Output of a reset command to the modem 31.

② Re-setting of the control parameters for the modem 31.

③ Turning of the modem 31 power off and then on (when turned on, an internal reset is performed at the modem 31).

The above are performed either individually or in arbitrary combinations. As a result, the stoppage of operation, by a hangup for example, is eliminated by the resetting, and the setting of control parameters anew corrects corrupted parameters, thereby overcoming the problem of communications errors which occur after long periods of operation of the modem 31.

(ii) An apparatus which includes the control section 33 and the modem 31 has a power supply controller 36 which has a first power switch S1 which turns on and off the modem 31, and a second power switch S2 which is controlled by the main power switch S1 and which turns on and off the power of the control section 33 when the main power switch is in the on condition. When the power-on section 34 turns on the auxiliary power switch S2 in response to a received call, the power-off section 35 turns the auxiliary power switch S2 off when the control section 33 is in the wait-for-call condition. As a result, when in the wait-for-call condition, power is applied to only the modem 31, resulting in the achievement of power savings.

In the case of the above-described constitution, as described below, it is possible to simplify the initialization of the modem 31, specifically as follows.

① When the auxiliary power switch S2 is turned on by a received call, a command from the control section initializes the modem 31.

② When the auxiliary power switch S1 is turned on and the auxiliary power switch S2 is turned off, that is, when in the non-communicating condition, the main power switch S1 is periodically switched off and then on. By doing this, the power to the modem 31 is repeatedly switched on and off, causing an internal reset. When the auxiliary power switch S2 is turned on, the periodic turning on and off of the main power switch S1 is prevented.

③ In the above-noted ②, when there is no incoming call, the auxiliary power switch S2, rather than the main power switch S1, is switched on and off. By doing this, the control section 33 initializes the modem 31.

④ The modem 31 is initialized when the power to the control section 33 is switched off. This method provides a less effective initialization than the method ①, although receiving operation is faster.

As described above, according to present invention, because the modem 31 is initialized both periodically and at the time of the reception of an incoming call, communications errors and hangups caused by data corrupted due to noise and the like can be prevented.

Next the embodiments of the non-interrupted operation control apparatus for a modem according to the present invention will be described in detail.

Figure 4:
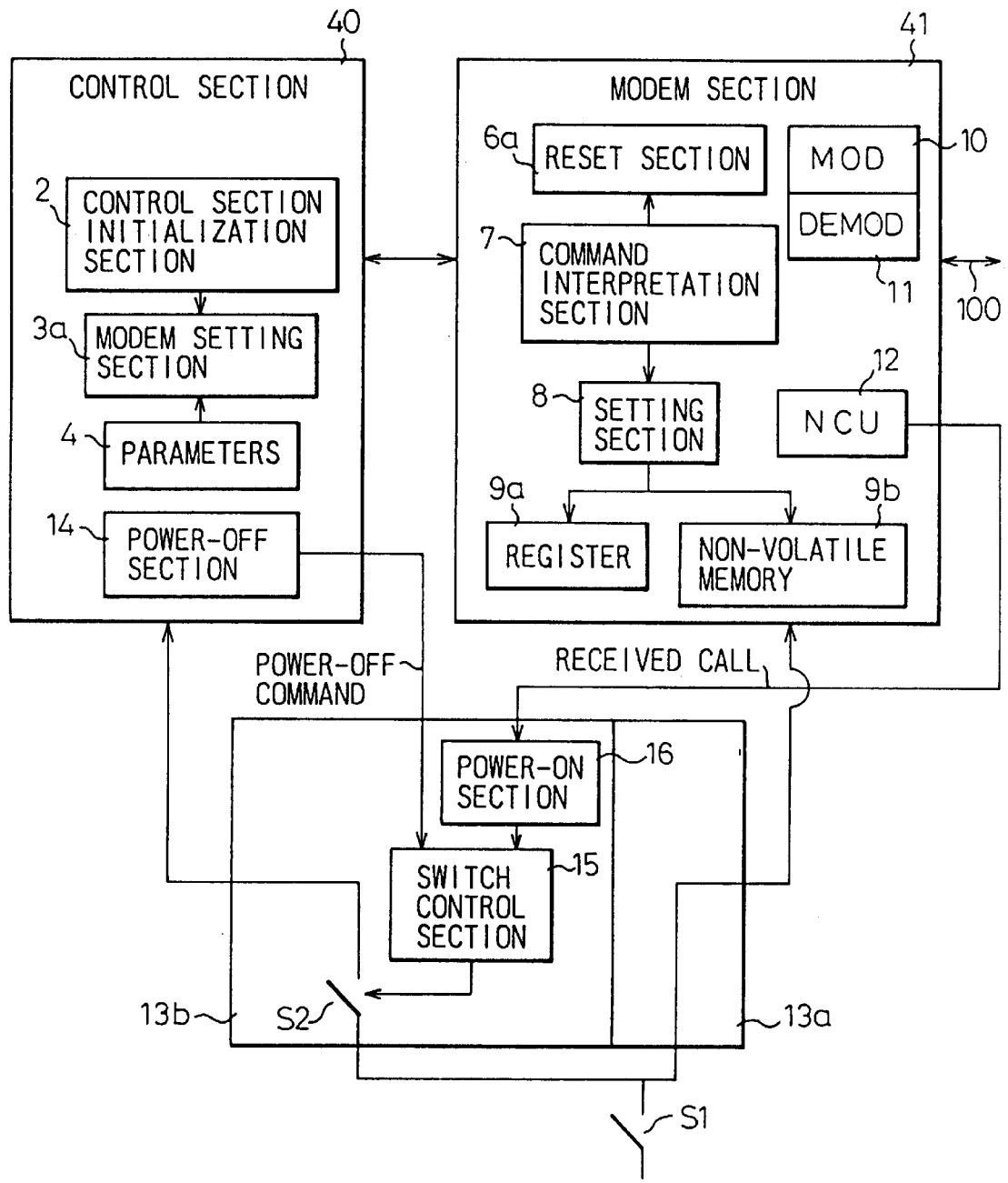
FIG. 4 is a block diagram which shows the first embodiment of a non-interrupted operation control apparatus for a modem according to the present invention.

FIG. 4 is a block diagram which shows the first embodiment of a non-interrupted operation control apparatus for a modem according to the present invention.

Figure 5:
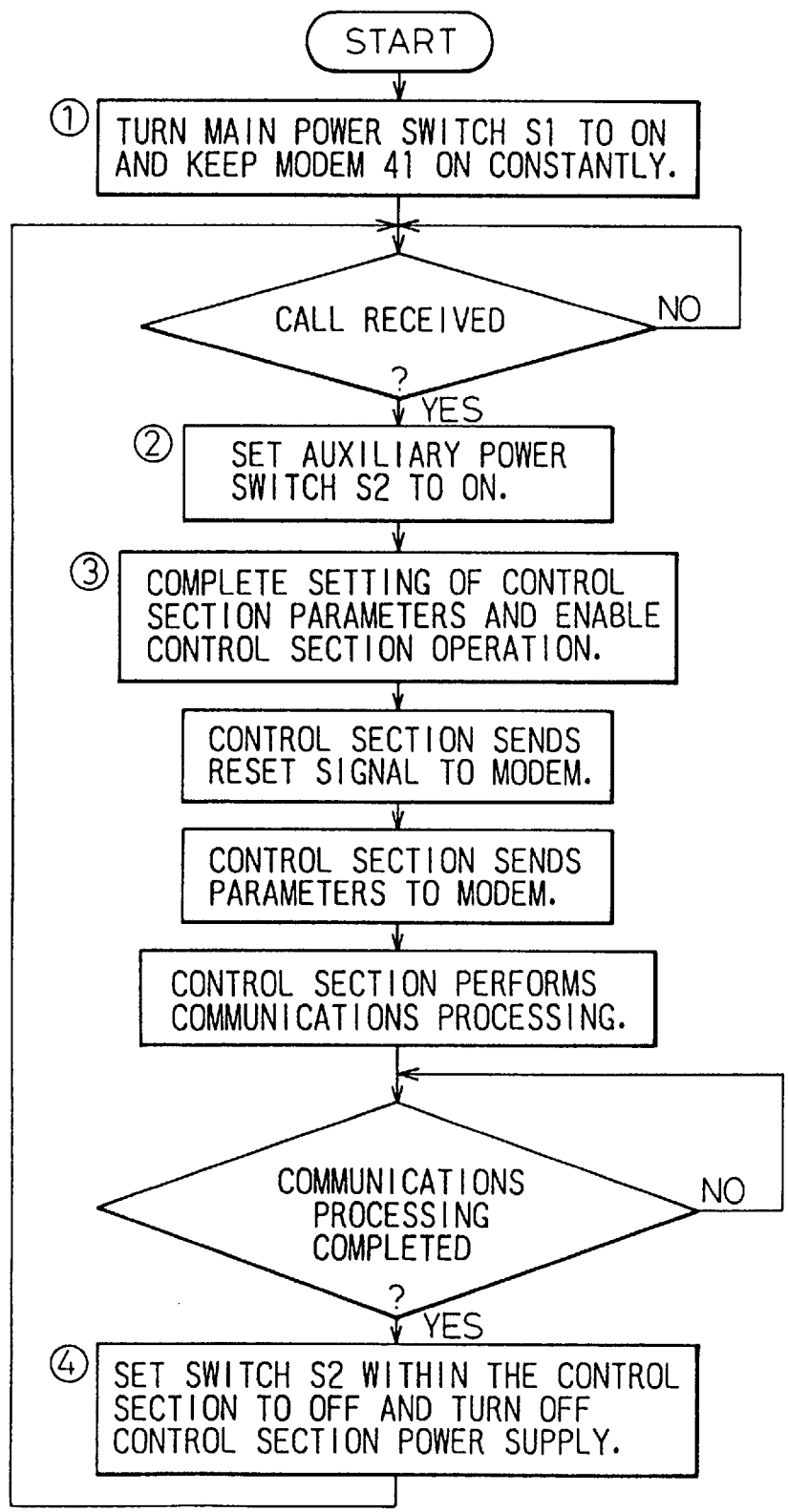
FIG. 5 is a flowchart which shows an example of the control flow of the first embodiment of the present invention shown in FIG. 4.

FIG. 5 is a flowchart which shows an example of the control flow in the first embodiment of the present invention shown in FIG. 4.

Figure 6:
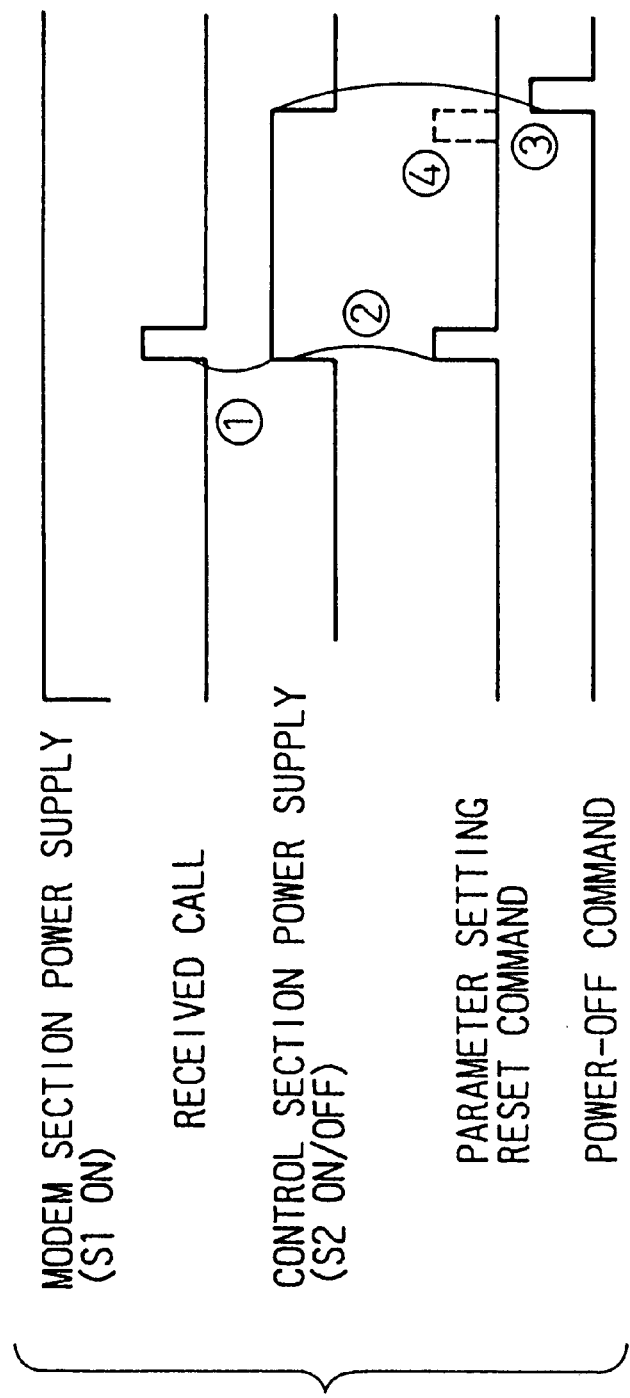
FIG. 6 is a timing chart which shows an example of the timing of the first embodiment of the present invention shown in FIG. 4.

FIG. 6 is a timing chart which shows an example of the timing of the first embodiment of the present invention shown in FIG. 4.

As shown in FIG. 4 and FIG. 5, this embodiment operates as follows.

① A main power switch S1 and an auxiliary power switch S2 are provided, the main power switch S1 being turned on to apply constant power to the modem 41.

② The auxiliary power switch S2 is turned on (control section power on) when an incoming call is received.

③ The control section 40 resets the modem 41 when the power is switched on (or immediately before switching off) and also performs communications processing, such as reception of calls, after the parameters are set anew.

④ When the communications processing is completed and the wait-for-call condition is enabled, a command from the control section 40 turns the auxiliary power switch S2 off.

In FIG. 4, the modem setting section 3a of the control section 40 starts after the power is applied to the control section 40 and the control section initialization section 2 operates. After it starts, the modem setting section 3a outputs a reset signal to the modem 41, and sends setting commands and parameters 4 to the modem 41. The parameters 4 are control parameters which, for example, set the communications mode of the modem 41, and these can be stored in a file, for example, and sent to the modem 41 by the modem setting section 3a. At the modem 41, the received parameters are stored by the setting section 8 into the register 9a or into the non-volatile memory 9b.

When the control section 40 is in the wait-for-call condition, the power-off section 14 of the control section 40 sends an off command to the switch control section 15 of the control section power supply 13b.

By virtue of the above-described constitution, each time the power supply (auxiliary power switch S2) is set to on, the control section 40 resets the modem section 41 and sends parameters 4 to the modem section 41.

In the modem section 41 which is shown in FIG. 4, the reset setting 6a performs an internal model reset:

① when the main power switch S1 is turned on, thereby applying power to the modem section 41, ② if the reset button of the modem section 41 is pressed when the power is applied, and ③ when a reset command is received from the control section 40.

The operation of other parts is the same as in the prior art modem section 5, which is illustrated in FIG. 1.

The power supply of this apparatus is made up of a control section power supply 13b and a modem section power supply 13a, modem section power supply 13a being turned on by the main power switch S1 and control section power supply 13b being turned on by the auxiliary power switch S2. While the main power switch S1 is normally turned on and off manually, the turning on and off of the auxiliary power switch S2 is controlled by the switch control section 15. The power-on section 16 of the control section power supply 13b generates a power-on command in response to a call received command signal (for example a 16-Hz ringing tone) from the network control unit (NCU) 12 of the modem section 41. In the wait-for-call condition, however, the power-off section 14 provided in the control section 40 issues a power-on command. The switch control section 15 performs on/off control of the auxiliary power switch S2 in response to the above-described two types of commands.

By virtue of the above-described constitution, initialization of the modem section 41 is performed in accordance with the timing shown in FIG. 6. In FIG. 6, with the main power switch S1 in the on condition, only the modem section 41 is in the wait-for-call operating condition. In FIG. 6 (refer also to FIG. 5), the following operations occur.

① With the main power switch S1 in the on condition, when the network control unit 12 detects an incoming call, the power-on section 16 of the control section power supply 13b sends a power-on command to the switch control section 15.

② As a result of ①, the auxiliary power switch S2 is turned on, the control section power supply 13b is switched on, the control section 40 is started. First, the control section initialization section 3a resets the various internal parts of the control section 40, and after initialization is performed the modem setting section 3a sends a reset command and parameters 4 to the modem section 41. By doing this, the associated parameters are set into the register 9a and the non-volatile memory 9b by the setting section 8.

③ After the completion of the setting of parameters, the prescribed communications are performed, and at the point at which the communications and the associated processing have been completed, the power-off section 14 of the control section 40 outputs a power-off command to the switch control section 15 of the control section power supply 13b, causing the auxiliary power switch S2 to be turned off.

In this manner, the auxiliary power switch is turned on each time an incoming call is received, and since communications are performed after the resetting and parameter settings are made from the control section 40 with respect to the modem section 41, modem section 41 operates normally at all times.

The above is the example of the initialization of the modem section 41. If the initialization is performed before communications, the communications and associated processing are always delayed by the initialization. For this reason, there is a method of performing the initialization of the modem section 41 immediately before the auxiliary power switch S2 is turned off. In FIG. 6, the circled 4 indicated by a broken line ④ shows the timing associated with this method.

In the above-described embodiment, when the power to the apparatus is first turned on, that is, when the main power switch S1 is turned on, the auxiliary power switch S2 must always be turned on, and after the initialization of the modem section 41 is completed, that is, after an incoming call is received, the auxiliary power switch S2 is turned of and the wait-for-call condition is entered. By doing this, even at the first received incoming call the modem section 41 will operate normally, and thereafter will be initialized and go into the wait-for-call condition each time communications are completed.

Although in the above-described first embodiment of the present invention, the auxiliary power switch S2 is turned on at each received call, it is obvious that it is possible to provide a timer to turn power on and off at a prescribed time interval, thereby causing initialization at a given time interval.

Next, the second embodiment of a non-interrupted operation control apparatus for a modem according to the present invention will be described.

Figure 7:
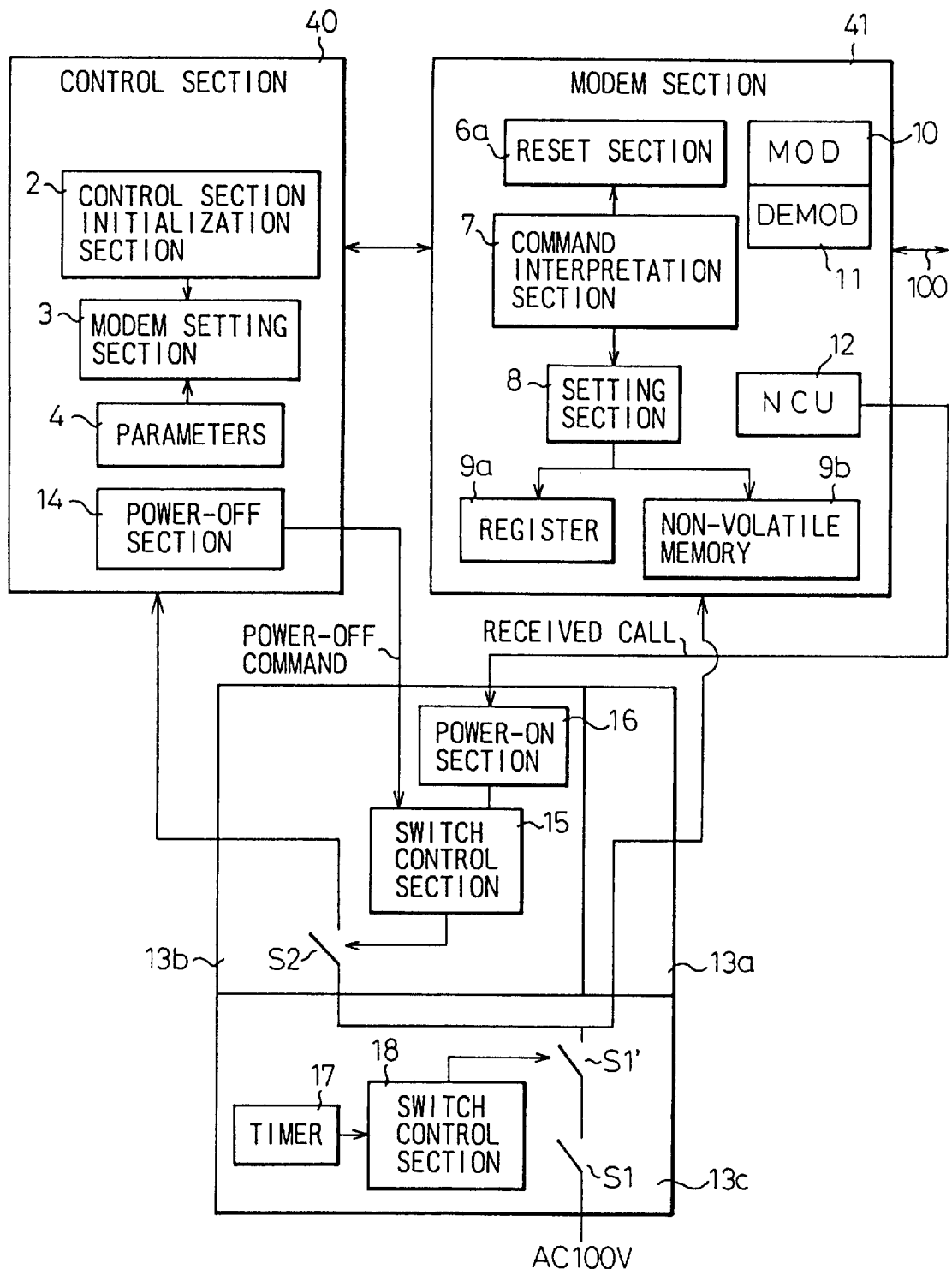
FIG. 7 is a block diagram which shows the second embodiment of a non-interrupted operation control apparatus for a modem according to the present invention.
Figure 8:
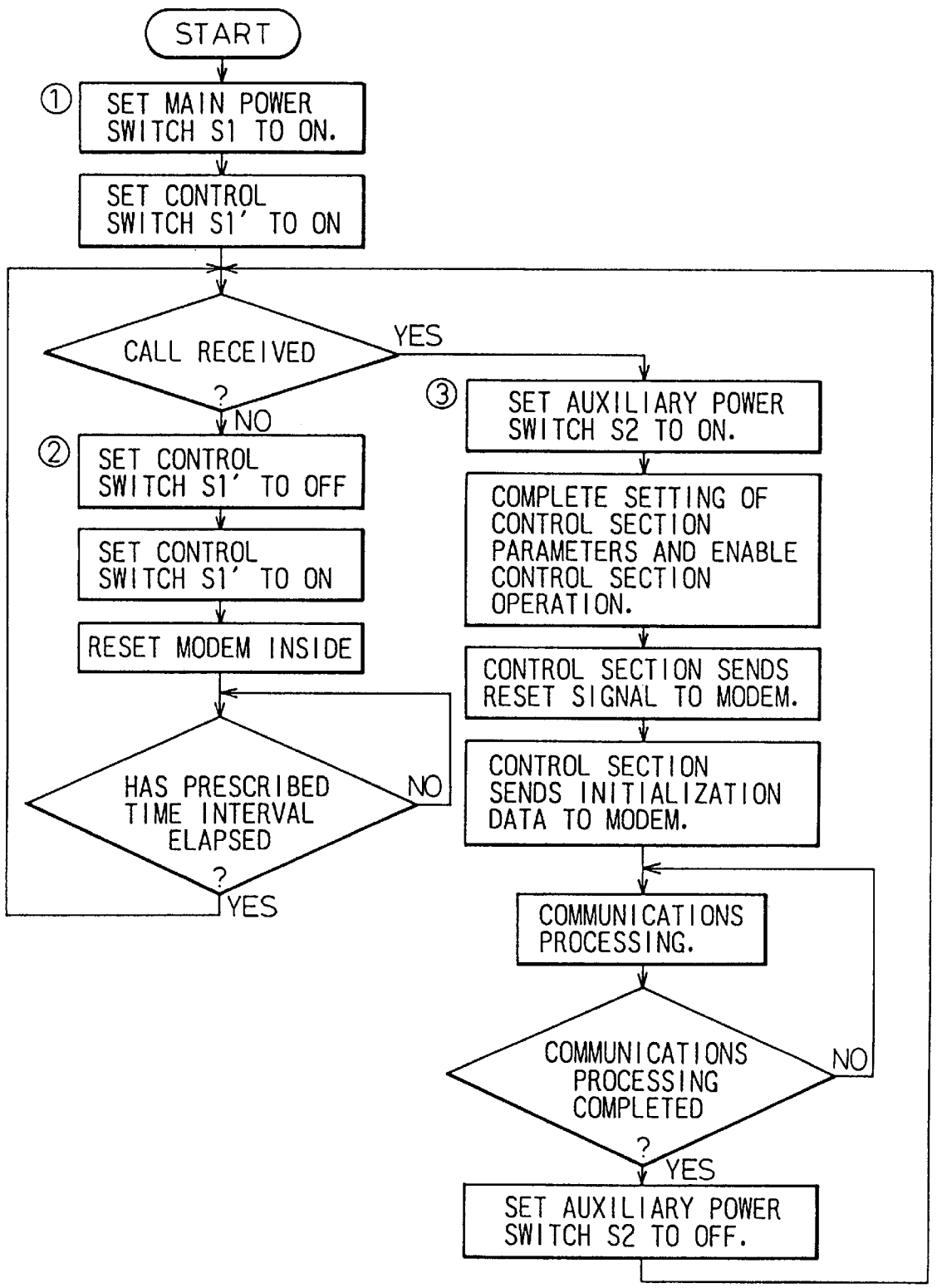
FIG. 8 is a flowchart which shows the control flow of the second embodiment of the present invention shown in FIG. 7.
Figure 9:
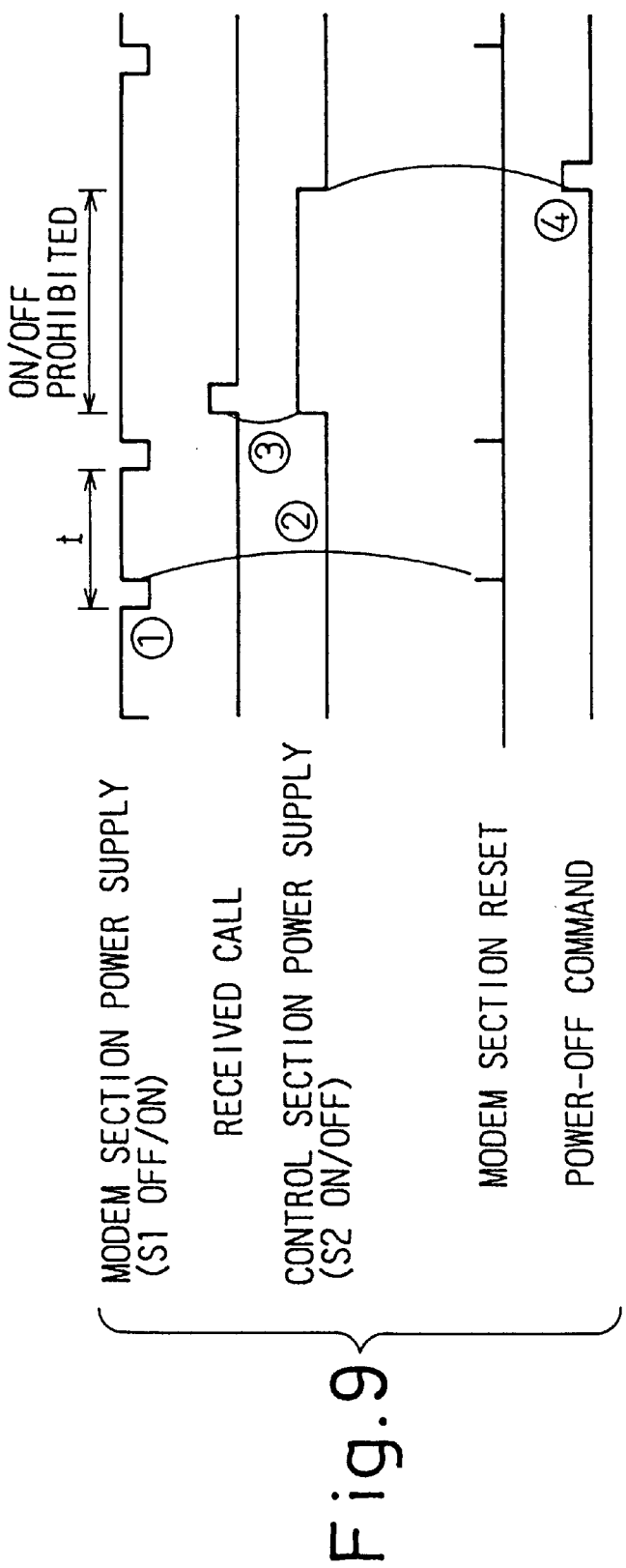
FIG. 9 is a timing chart which shows the timing of the second embodiment of the present invention shown in FIG. 7.

FIG. 7 is a block diagram which shows the second embodiment of a non-interrupted operation control apparatus for a modem according to the present invention. FIG. 8 is a flowchart which shows an example of the control flow of the second embodiment of the present invention shown in FIG. 7, and FIG. 9 is a timing chart which shows an example of the timing of the second embodiment of the present invention shown in FIG. 7.

As shown in FIG. 7 and FIG. 8, in the second embodiment the apparatus has a constitution which has a main power switch S1 and an auxiliary power switch S2 (①), and wherein, in the wait-for-call condition, if modem section power supply 13a is periodically turned on and off to reset the modem section 41 (②), and further wherein when the power supply of the control section 40 is turned on by the receipt of a call, the turning of the modem section power supply 13a on and off is stopped (③).

Because a main power supply section 13c is added to the constitution of the first embodiment, the initialization operation of the first embodiment is performed simultaneously.

In FIG. 7 the timer 17 of the main power supply section 13c sends a signal to the switch control section 18 every given time t. The switch control section 18 turns on and off the main power switch S1 by means of a signal from the timer 17. (Since the main power switch S1 is manual in this case, a control switch S1' is connected in series with S1 and S1', rather than S1, is controlled.) It should be noted that the switch control section 15 of the control power supply section 13b stops the turning on and off of the switch S1 from the time the auxiliary power switch S2 on signal is output until the off signal is output.

By virtue of the above-described constitution, as shown in FIG. 9, the modem section 41 reset operation is performed at a given time interval t. First, when the main power switch S1 is turned on, switch S1' is turned on, the modem power supply 13a is turned on, and the modem section 41 goes into the wait-for-call condition.

Then, the following actions occur.

① Simultaneously with the above, the timer 17 outputs a signal at a fixed time interval. When this signal is output, if the auxiliary power switch S2 is off (no received call), the switch control section 18 sets the switch S1' to off and then to on.

② When switch S1' is turned on in this manner, the reset section 6a of the modem section 41 performs a reset the various internal parts of the modem section 41. By doing the above, it is possible to prevent stoppage of operation such as when a hang occurs in the modem section 41.

③ In the above-described ①, in the case in which the auxiliary power switch S2 is on, that is, in the case in which the control section power supply 13b is on, a call is being received and the modem section 41 is reset by the control section 40, communications is performed after resetting of the parameters, and at the point at which the communications are completed, the auxiliary power switch S2 is set to off. During the communications, the operations described in ① and ② above are prohibited.

In the above-noted embodiment, although the example of a combination with the first embodiment is shown, it is effective even if only periodic on/off switching of the main power switch S1 is performed to reset the modem section 41, and in such a case this is effective in systems in which long receiving periods do not occur.

Next, the third embodiment of a non-interrupted operation control apparatus for a modem according to the present invention will be described.

Figure 10:
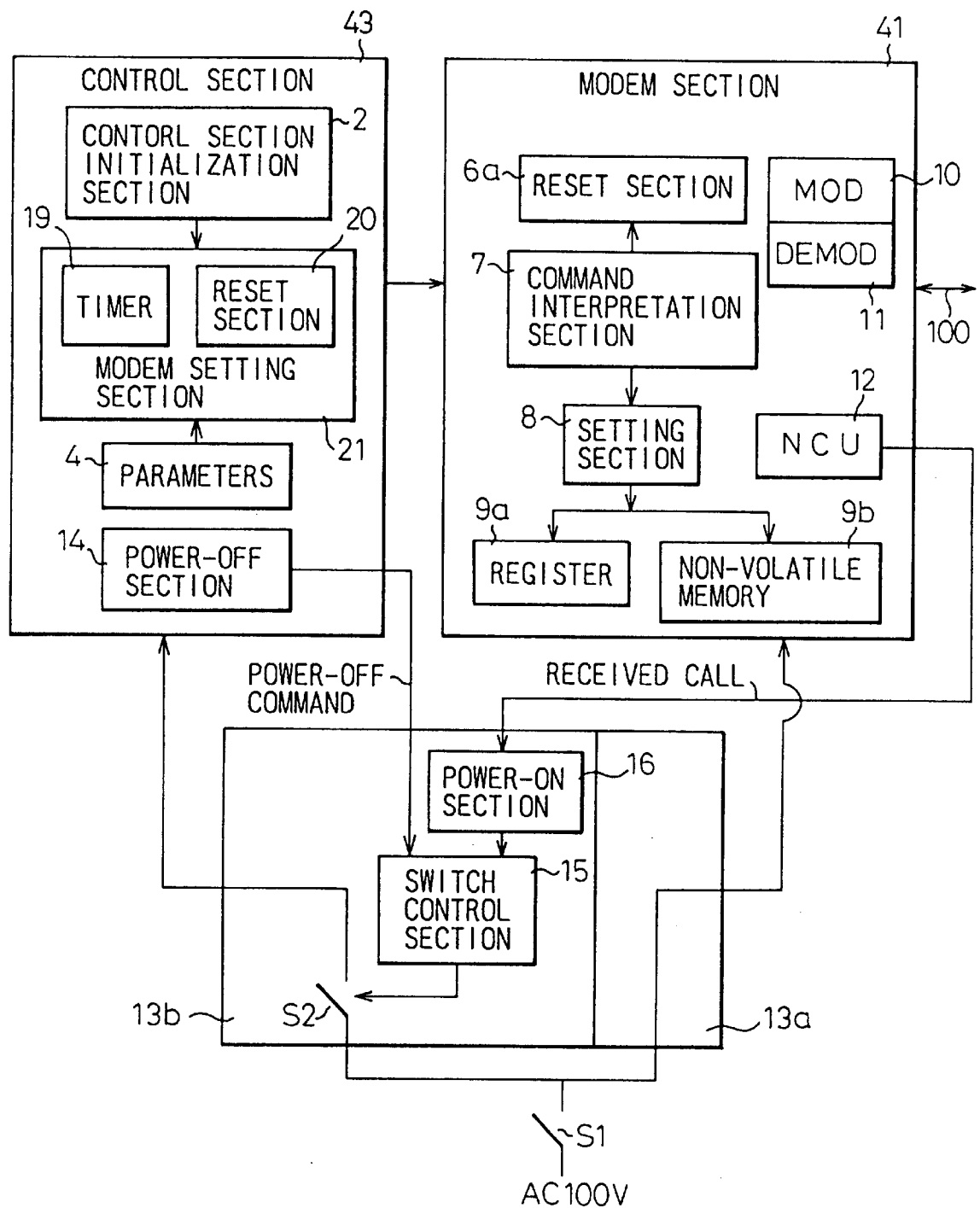
FIG. 10 is a block diagram which shows the third embodiment of a non-interrupted operation control apparatus for a modem according to the present invention.
Figure 11:
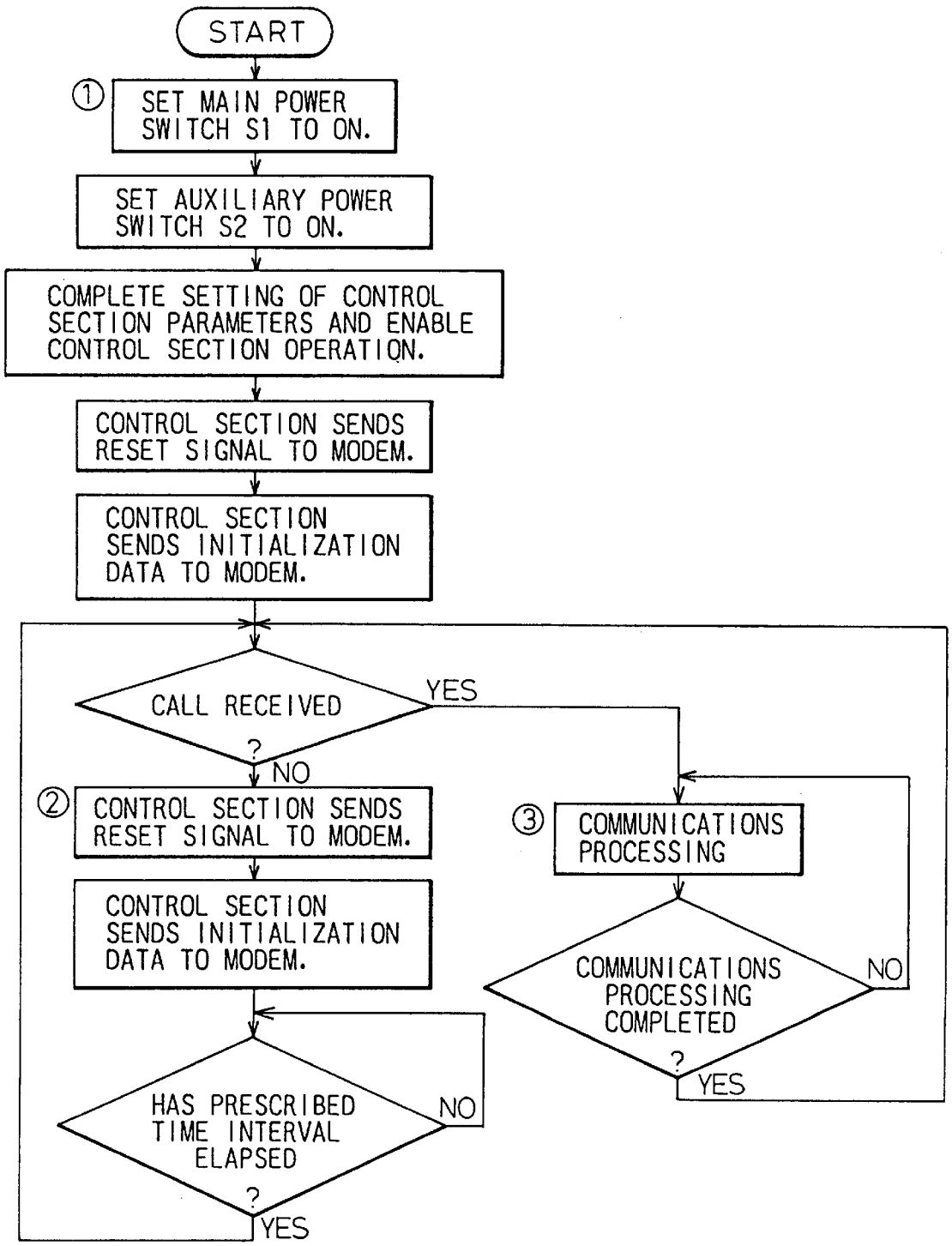
FIG. 11 is a flowchart which shows the control flow of the third embodiment of the present invention shown in FIG. 10.
Figure 12:
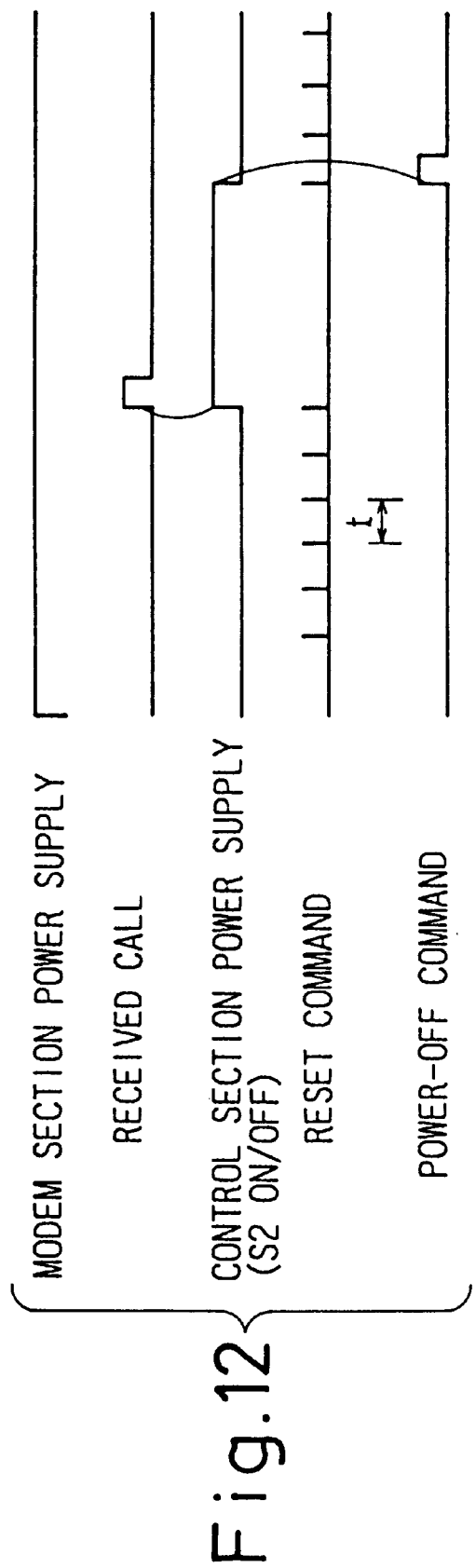
FIG. 12 is a timing chart which shows the timing of the third embodiment of the present invention shown in FIG. 10.

FIG. 10 is a block diagram which shows the third embodiment of a non-interrupted operation control apparatus for a modem according to the present invention. FIG. 11 is a flowchart which shows an example of the control flow of the third embodiment of the present invention shown in FIG. 10, and FIG. 12 is a timing chart which shows an example of the timing of the third embodiment of the present invention shown in FIG. 10.

As shown in FIG. 10, the third embodiment of the present invention is shown as the example in which, when a control section 43 is powered on and no call is being received, a reset signal is output to the modem section 41 from the control section 43. This embodiment is applicable to a system in which the power supplies of the modem section 41 and control section 43 are on at all times. A main power switch S1 and an auxiliary power switch S2 are provided as shown in FIG. 10, with the main power switch S1 and auxiliary power switch S2 turned on at the same time. In the embodiment shown in FIG. 10

① when the main power switch S1 is turned on the auxiliary power switch S2 is turned on and initialization processing of the modem section 41 is performed by the initialization of the control section 43.

②  If there no call is received, the control section 43 periodically performs initialization of the modem section 41, but, ③ if there is a call received the initialization is stopped and communications processing is performed.

In the control section 43 shown in FIG. 10, a modem setting section 21 has a timer 19 which outputs a signal at given time intervals and a reset section 20 which outputs a reset command to the modem section 41, this signal performing initialization processing such as shown in FIG. 12.

When the control section power supply 13b is turned on, the modem setting section 21 outputs a reset command (including sending of initialization data) to the modem section 41, after which the modem setting section 21 outputs a reset command to the modem section 41 every fixed time interval t as long as the control section power supply 13b remains turned on. At the modem section 41, these commands are interpreted by the command interpretation section 7, and the reset section 6a resets various hardware. By doing this, it is possible to eliminate operation stoppages caused by, for example, a hang of the modem 41. Of course, in the embodiment shown in FIG. 10, the sending of the reset command is prevented during communications processing as indicated in ③ above.

It is possible, as described above, to eliminate the abnormal stoppage of operation or misoperation of the modem, by periodically resetting the modem and setting parameters anew. The method of turning on power when a call is received is particularly simple, and it is possible to perform the previously described initialization processing methods either individually or in combination to achieve the ideal method suited to the operation mode of the apparatus.

As described in detail above, according to the present invention, a simple method is provided for not only periodically resetting a modem which might be remain in the standby condition for many days but also for periodically setting control parameter values anew into internal nonvolatile memory within the modem, thereby eliminating corruption of control parameter data and circuit hangs which can cause abnormal modem operation.

What is claimed is:

1. A non-interrupted operation control apparatus for a continuously operating modem including a power supply, comprising:

a modem apparatus;

a controller; and a power supply controller, wherein said power supply controller further comprises:

a main power switch for turning on and off power supplied to said modem apparatus from said power supply;

an auxiliary power switch for turning on and off power supplied to said controller from said power supply when said main power switch is in the on condition; and a power-on/off section for turning on said auxiliary power switch when a received call is detected from a circuit with said main power switch in the on condition to begin communications, and turning off said auxiliary power switch when communications is completed and a wait-for-call condition occurs, to thereby initialize said modem apparatus when either of said main power switch or said auxiliary power switch is turned on;

wherein said non-interrupted operation control apparatus further comprises an initialization means for performing initialization of said modem apparatus immediately prior to said power supplied to said modem apparatus being turned off, and for turning off and on said main power switch when said main power switch is on and said auxiliary power switch is off.

2. A non-interrupted operation control apparatus for a modem according to claim 1, wherein said initialization means prohibits a periodic on/off control of said main power switch when said auxiliary power switch is on.

* * * * *